(12) United States Patent
Todd

(10) Patent No.: US 7,195,068 B2
(45) Date of Patent: Mar. 27, 2007

(54) FILTER CAKE DEGRADATION COMPOSITIONS AND METHODS OF USE IN SUBTERRANEAN OPERATIONS

(75) Inventor: Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 433 days.

(21) Appl. No.: 10/736,152

(22) Filed: Dec. 15, 2003

(65) Prior Publication Data

US 2005/0126785 A1  Jun. 16, 2005

(51) Int. Cl.
*E21B 37/00* (2006.01)
*E21B 43/27* (2006.01)

(52) U.S. Cl. ............... 166/300; 166/307; 166/312; 175/72; 507/239; 507/265; 507/267; 507/269

(58) Field of Classification Search ......... 166/278, 166/300, 307, 312; 175/72; 507/239, 265, 507/267, 269, 272, 277, 925, 927, 929
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | |
| 3,968,840 A | 7/1976 | Tate | 166/280.1 |
| 3,998,272 A | 12/1976 | Maly | 166/281 |
| 3,998,744 A | 12/1976 | Arnold et al. | 507/269 |
| 4,068,718 A | 1/1978 | Cooke, Jr. et al. | 166/280.2 |
| 4,169,798 A | 10/1979 | DeMartino | |
| 4,172,066 A | 10/1979 | Zweigle et al. | 260/29.6 TA |
| 4,261,421 A | 4/1981 | Watanabe | 166/281 |
| 4,387,769 A | 6/1983 | Erbstoesser et al. | 166/295 |
| 4,460,052 A | 7/1984 | Gockel | 175/72 |
| 4,470,915 A | 9/1984 | Conway | |
| 4,498,995 A | 2/1985 | Gockel | |
| 4,526,695 A | 7/1985 | Erbstoesser et al. | |
| 4,694,905 A | 9/1987 | Armbruster | |
| 4,715,967 A | 12/1987 | Bellis | |
| 4,716,964 A | 1/1988 | Erbstoesser et al. | 166/284 |
| 4,785,884 A | 11/1988 | Armbruster | |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,957,165 A | 9/1990 | Cantu et al. | 166/295 |
| 4,961,466 A | 10/1990 | Himes et al. | |
| 4,986,353 A | 1/1991 | Clark et al. | 166/279 |
| 4,986,354 A | 1/1991 | Cantu et al. | 166/279 |

(Continued)

FOREIGN PATENT DOCUMENTS

EP  0 510 762 A2  4/1992

(Continued)

OTHER PUBLICATIONS

Cantu, et al., "Laboratory and Field Evaluation of a Combined Fluid-Loss Control Additive and Gel Breaker for Fracturing Fluids," SPE 18211.

(Continued)

*Primary Examiner*—George Suchfield
(74) *Attorney, Agent, or Firm*—Robert A. Kent; Baker Botts

(57) ABSTRACT

The present invention relates to methods and compositions for degrading filter cakes in subterranean formations, and more specifically, to improved methods and compositions for degrading filter cakes that comprise acid-soluble portions and polymeric portions. In one embodiment, the present invention provides a method of degrading a filter cake comprising an acid-soluble portion and a polymeric portion in a subterranean formation comprising the steps of: introducing a filter cake degradation composition comprising a delayed-release acid component and a delayed-release oxidizer component to a well bore penetrating the subterranean formation; allowing the delayed-release acid component to release an acid derivative and the delayed-release oxidizer component to release an acid-consuming component; allowing the acid-consuming component to interact with the acid derivative to delay a reaction between at least a portion of the acid derivative and at least a portion of the acid-soluble portion of the filter cake and to produce hydrogen peroxide; allowing the acid derivative to degrade at least a portion of the acid-soluble portion of the filter cake after a delay period; and allowing the hydrogen peroxide to degrade at least a portion of the polymeric portion of the filter cake.

25 Claims, No Drawings

U.S. PATENT DOCUMENTS

| | | | |
|---|---|---|---|
| 4,986,355 A | 1/1991 | Casad et al. | 166/295 |
| 5,082,056 A | 1/1992 | Tackett, Jr. | 166/295 |
| 5,142,023 A | 8/1992 | Gruber et al. | 528/354 |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | 166/305 |
| 5,251,697 A * | 10/1993 | Shuler | 166/268 |
| 5,295,542 A | 3/1994 | Cole et al. | 166/278 |
| 5,325,923 A | 7/1994 | Surjaatmadja et al. | |
| 5,330,005 A | 7/1994 | Card et al. | |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | |
| 5,402,846 A | 4/1995 | Jennings, Jr. et al. | 166/259 |
| 5,439,055 A | 8/1995 | Card et al. | |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,591,700 A | 1/1997 | Harris et al. | 507/214 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B2 | 12/2003 | Tokiwa et al. | 106/162 |
| 6,681,856 B1 | 1/2004 | Chatterji et al. | 166/294 |
| 6,686,328 B1 | 2/2004 | Binder | 510/446 |
| 6,702,023 B1 * | 3/2004 | Harris et al. | 166/307 |
| 6,710,019 B1 | 3/2004 | Sawdon et al. | 507/136 |
| 6,761,218 B2 | 7/2004 | Nguyen et al. | 166/278 |
| 6,763,888 B1 | 7/2004 | Harris et al. | 166/305.1 |
| 6,817,414 B2 * | 11/2004 | Lee | 166/278 |
| 6,818,594 B1 * | 11/2004 | Freeman et al. | 507/101 |
| 6,896,058 B2 | 5/2005 | Munoz, Jr. et al. | 166/279 |
| 6,949,491 B2 | 9/2005 | Cooke, Jr. | 507/219 |
| 2001/0016562 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vallmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 * | 5/2004 | Sullivan et al. | 166/308.1 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0103496 A1 * | 5/2005 | Todd et al. | 166/278 |
| 2005/0272613 A1 | 12/2005 | Cooke, Jr. | 507/219 |

FOREIGN PATENT DOCUMENTS

| | | |
|---|---|---|
| EP | 0 579 466 A2 | 1/1994 |
| EP | 0 643 197 A2 | 3/1995 |
| EP | 0 672 740 A1 | 9/1995 |
| EP | 0 879 935 A2 | 11/1998 |
| EP | 0 879 935 A3 | 10/1999 |
| EP | 1 223 207 A1 | 7/2002 |
| EP | 1 413 710 A1 | 4/2004 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 2000/57022 | 9/2000 |
| WO | WO 2001/02698 | 1/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |

| | | |
|---|---|---|
| WO | WO 2004/007905 | 1/2004 |
| WO | WO 04/037946 A1 | 5/2004 |
| WO | WO 04/038176 A1 | 5/2004 |

OTHER PUBLICATIONS

Simmons, et al., "Poly(phenyllactide): Synthesis, Characterization, and Hydrolytic Degradation," Biomacromolecules, vol. 2, No. 3, 2001 (pp. 658-663).

Yin, et al., "Preparation and Characterization of Substituted Polylactides," Am. Chem. Soc., vol. 32, No. 23, 1999 (pp. 7711-7718).

Yin, et al., "Synthesis and Properties of Polymers Derived form Substituted Lactic Acids," Am. Chem. Soc., Ch. 12, 2001 (pp. 147-159).

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid*, Short Report, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Blauch, et al, *Aqueous Tackifier and Methods for Controlling Particulates*, U.S. Appl. No. 10/864,061, filed Jun. 9, 2004.

Blauch, et al, *Aqueous-Based Tackifier Fluids and Methods of Use*, U.S. Appl. No. 10/864,618, filed Jun. 9, 2004.

U.S. Appl. No. 10/650,101, Todd et al.
U.S. Appl. No. 10/661,173, Todd et al.
U.S. Appl. No. 10/664,126, Todd et al.
U.S. Appl. No. 10/655,883, Nguyen.

Y. Chiang et al.: "Hydrolysis of Ortho Esters: Further Investigation of the Factors Which Control the Rate-Determining Step," Engineering Information Inc., NY, NY, vol. 105, No. 23 (XP-002322842), Nov. 16, 1983.

M. Ahmad, et al.: Ortho Ester Hydrolysis: Direct Evidence for a Three-Stage Reaction Mechanism, Engineering Information Inc., NY, NY, vol. 101, No. 10 (XP-002322843), May 9, 1979.

Foreign communication from a related counterpart application dated Apr. 28, 2005.

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709.

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdeilaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

* cited by examiner

FILTER CAKE DEGRADATION COMPOSITIONS AND METHODS OF USE IN SUBTERRANEAN OPERATIONS

BACKGROUND OF THE INVENTION

The present invention relates to methods and compositions for degrading filter cakes in subterranean formations, and more specifically, to improved methods and compositions for degrading filter cakes that comprise acid-soluble portions and polymeric portions.

Many oil and gas wells in unconsolidated or poorly consolidated sandstone formations are completed "open hole," meaning that the well bores do not contain casing or liners. Although this type of completion allows the produced fluids to flow directly into the wellbore, it suffers the disadvantage that the sandface is unsupported and may collapse. Also, selective treatments or remedial operations within the reservoir section may be more difficult.

Unconsolidated or poorly consolidated formations generally are high permeability production intervals and are drilled with specialized fluids referred to in the art as "drill-in fluids." A drill-in fluid generally comprises two components: particulate solids (e.g., for bridging on the pore throats of the sandstone of the formation); and polymeric components (e.g., for providing viscosity and fluid loss control). Under pressurized downhole conditions, the drill-in fluid may form a filter cake that comprises an acid-soluble portion (e.g., calcium carbonate bridging solids) and a polymeric portion on the face of a portion of the subterranean formation. In most instances, once formed, the integrity of the filter cake should be maintained to provide the necessary fluid loss control and hole stability for subsequent operations. A common subsequent treatment is a gravel pack sand control operation that involves running a screen into the open hole interval, and pumping a gravel pack treatment fluid comprising gravel into the annulus between the screen and open hole to form a gravel pack.

Generally, at some point after the gravel pack is placed, it is desirable to remove the filter cake from the formation face as it may act as an impediment to the production of desirable fluids from the formation. However, degrading the filter cake may be difficult since the screen and gravel pack tend to prevent the filter cake degradation composition from interacting with the filter cake. Degrading the filter cake may be even more difficult, considering that the degradation is generally best when it is uniformly accomplished along what may be thousands of feet of open hole. Thus, because the gravel and gravel pack carrier fluid contact the filter cake uniformly across the entire interval, placing components with the gravel pack that are capable of ultimately degrading the filter cake would be desirable if such degradation could be delayed long enough to ensure that the placement of the gravel pack treatment is not jeopardized or high fluid loss rates are not incurred until the completion equipment is installed.

To degrade the acid-soluble particulate portion of the drill-in fluid filter cake, a conventional delayed-release acid system usually may be used. A common type of delayed-release acid system comprises esters that slowly hydrolyze to form acids that may ultimately degrade the acid-soluble portion of the filter cake. These delayed-release acid systems, however, can be problematic if they degrade the acid-soluble component of the filter cake too slowly or too quickly. Removal of only 1% to 2% of the bridging solids in the filter cake can result in a significant loss of fluid to the surrounding formation. If a delayed-release acid system is designed not to dissolve more than 1% or 2% of the acid-soluble portion of the filter cake in a chosen period of time (e.g., a 12-hour period), then total removal may take days, if not weeks. This is undesirable. On the other hand, if a delayed-release acid system is designed to totally degrade the acid-soluble portion within an acceptable "total cleanup time" (e.g., 24 to 48 hours), it is likely to cause hole instability and potential fluid loss problems during gravel pack placement. To control such fast-acting delayed-release acid systems, buffers (which are mixtures of weak acids and their conjugate bases) may be considered to achieve a delayed interaction of the acid with the acid-soluble portion of the filter cake for a desired time period. However, such conventional buffer systems have met with little success when used with these delayed-release acid systems, inter alia, because the esters may undergo acid- or base-catalyzed hydrolysis at pHs much below or above 7. Also, conventional buffers may suffer when exposed to components, such as calcium carbonate, in the filter cake and, as a result, the acid component of the buffer may be quickly consumed.

Oxidizers have been used to degrade the polymeric portions of filter cakes within desired delay and total cleanup times. Since these oxidizers are not able to degrade the acid-soluble portion of a filter cake, the usefulness of such oxidizer systems generally is limited to cases where the bridging particles that comprise the particulate portion of the filter cake are small enough to flow back through the screen.

Filter cake degradation compositions and methods that would accomplish degradation of filter cakes, both the acid-soluble portions and the polymeric portions, in a desired period of time without negatively impacting the integrity of the filter cakes (e.g., degrading more than about 1% of the acid-soluble portion) for a desired delay period would be desirable.

SUMMARY OF THE INVENTION

The present invention relates to methods and compositions for degrading filter cakes in subterranean formations, and more specifically, to improved methods and compositions for degrading filter cakes that comprise acid-soluble portions and polymeric portions.

In one embodiment, the present invention provides a method of degrading a filter cake comprising an acid-soluble portion and a polymeric portion in a subterranean formation comprising the steps of: introducing a filter cake degradation composition comprising a delayed-release acid component and a delayed-release oxidizer component to a well bore penetrating the subterranean formation; allowing the delayed-release acid component to release an acid derivative and the delayed-release oxidizer component to release an acid-consuming component; allowing the acid-consuming component to interact with the acid derivative to delay a reaction between at least a portion of the acid derivative and at least a portion of the acid-soluble portion of the filter cake and to produce hydrogen peroxide; allowing the acid derivative to degrade at least a portion of the acid-soluble portion of the filter cake after a delay period; and allowing the hydrogen peroxide to degrade at least a portion of the polymeric portion of the filter cake.

In one embodiment, the present invention provides a filter cake degradation composition comprising a delayed-release oxidizer component that releases an acid-consuming component and a delayed-release acid component that releases an acid derivative.

The features and advantages of the present invention will be readily apparent to those skilled in the art upon a reading of the description of the preferred embodiments, which follows.

DESCRIPTION OF PREFERRED EMBODIMENTS

The present invention relates to methods and compositions for degrading filter cakes in subterranean formations, and more specifically, to improved methods and compositions for degrading filter cakes that comprise acid-soluble portions and polymeric portions. The methods and compositions of the present invention are particularly useful for degrading filter cakes that result from drill-in fluids, e.g., in situations wherein such fluids are used in unconsolidated or poorly consolidated formations.

In most embodiments, the acid-soluble portion of a filter cake may comprise bridging agents such as calcium carbonate, chemically bonded ceramic bridging agents, magnesium compounds, and the like, that are usually subject to degradation by an acid. The polymeric portion of the filter cake may comprise polysaccharides, such as xanthan, succinoglycan, guar, or starch, or any of their derivatives. This polymeric portion is usually subject to degradation by a peroxide. An example of such a filter cake is a filter cake that has been deposited by a drill-in fluid.

The filter cake degradation compositions of the present invention comprise a delayed-release oxidizer component that will release an acid-consuming component, and a delayed-release acid component that will release an acid derivative. When a filter cake degradation composition of the present invention has been added to a well bore penetrating a subterranean formation to degrade a filter cake, the acid-consuming component interacts with acids in such a way that the acids do not interact with the acid-soluble portion of the filter cake for a period of time. In effect, this delays degradation of the acid-soluble portion of the filter cake by the acid. Thus, the integrity of the filter cake may not be jeopardized for a given desired delay period. It is important to note that a very small percentage of the acid-soluble portion of the filter cake (e.g., less than about 2%) need be degraded to compromise the integrity of the filter cake. The reaction between the acid-consuming component and the acid derivative also generates a peroxide that ultimately can degrade the polymeric portion of the filter cake. For instance, if calcium peroxide is used, when the calcium peroxide interacts with acetic acid, calcium acetate and hydrogen peroxide are produced. The hydrogen peroxide then is able to interact with the polymeric portion of the filter cake to ultimately degrade at least a portion of the polymeric portion of the filter cake.

In certain preferred embodiments, the delayed-release oxidizer components of the present invention comprise acid-consuming components such as peroxides. Suitable examples include $ZnO_2$, $CaO_2$, and $MgO_2$. Generally, the delayed-release oxidizer component will be present in filter cake degradation compositions of the present invention in an amount sufficient to delay interaction between the acid derivative of the delayed-release acid component and the acid-soluble portion of the filter cake, and in an amount sufficient to produce a sufficient amount of peroxide (e.g., hydrogen peroxide) when reacting with the acid derivative to ultimately degrade at least a portion of the polymeric portion of the filter cake. In certain embodiments, the delayed-release oxidizer component will comprise at least about 0.1% to about 4%, and preferably in some embodiments about 0.2% to about 1%, of the filter cake degradation compositions of the present invention. If a long delay of the interaction between the acid derivative and the acid-soluble portion of the filter cake is desired, more of the acid-consuming component may be included. However, the particular, acid-derivative component of the delayed release acid composition, the particular components of the filter cake, and any other components present (e.g., other acids) will dictate the appropriate amount to include. Also, the desired delay period for degrading the filter cake should be considered in deciding what the appropriate relative concentrations of the delayed-release acid component and the delayed-release oxidizer component are in a filter cake degradation composition of the present invention. One of ordinary skill in the art, with the benefit of this disclosure, will recognize the appropriate amount of each component to include for a desired application.

In certain embodiments, the delayed-release oxidizer components may also comprise inherent by-products of the manufacture of such acid-consuming components. Such by-products may include derivatives such as oxides and hydroxides of the ion, e.g., calcium oxide, zinc oxide, magnesium oxide, zinc hydroxide, calcium hydroxide, and magnesium hydroxide. For instance, some commercial samples of calcium peroxide are only about 70% pure; the remaining 30% may comprise calcium oxide and calcium hydroxide. These by-products also may interact with the acid derivative to delay interaction of the acid derivative with the acid-soluble portion of the filter cake. Similarly, zinc peroxide and magnesium peroxide are commercially available with similar purity levels. Because of the effect that the by-products may have on the overall filter cake degradation, the relative purity of the acid-consuming component and its associated by-products should be considered.

In certain preferred embodiments, the delayed-release oxidizer components may be encapsulated, e.g., by a polymeric material, to delay the release of the acid-consuming component. Suitable examples include encapsulated $ZnO_2$ particulates, encapsulated $CaO_2$ particulates, encapsulated $MgO_2$ particulates, or combinations thereof. By encapsulating the delayed-release oxidizer component, a user may be able to place it into a servicing fluid or directly into a subterranean formation and to have some time before the encapsulated material begins to substantially interact with the acid derivative of the delayed-release acid component. In certain embodiments, the encapsulated delayed-release oxidizer component is released from within the encapsulating membrane by diffusion. For instance, fluid may move from outside the membrane through the membrane coating and into the core of the particle, whereupon it may dissolve the delayed-release oxidizer component. The concentration of the delayed-release oxidizer component within the membrane slowly becomes greater than the concentration outside the membrane, and the acid-consuming component of the delayed-release oxidizer component may diffuse through the membrane, whereupon it subsequently interacts with the acid derivative of the delayed-release acid component. Encapsulating the delayed-release oxidizer component may be accomplished by any known method available to one skilled in the art. One suitable method involves a fluidized bed-coating process. Another suitable method involves spray-coating the encapsulating resin onto the delayed-release oxidizer component. An exemplary encapsulation methodology is described in U.S. Pat. No. 5,373,901, assigned to Halliburton Energy Services, the relevant disclosure of which is incorporated herein by reference. For instance, the coating used to encapsulate the delayed-release oxidizer component may be a resin material that will degrade over time in the subterranean formation to release the delayed-release oxidizer and therefore the acid-consuming component. Suitable resins may comprise a partially hydrolyzed acrylic resin, preferably in an aqueous-based form, which is cross-linked with either an aziridine prepolymer or a carbodiimide. The term "partially hydrolyzed acrylic," as used herein, means any of the vinyl acrylic latex polymers containing from about 0% to about 60% by weight monovinyl aromatic content as styrene; from about 5% to about 25% by weight alpha, beta unsaturated carboxylic acid content; and from about 15% to about 95% by weight alkyl acrylate or methacrylate ester content. The unsaturated carboxylic acid can comprise, for example, acrylic acid or methyl acrylic acid or mixtures thereof. The alkyl acrylate or methacrylate ester can comprise, for example, ethyl butyl or 2-ethylhexylacrylate, methyl, butyl, or isobutyl methacrylate or mixtures thereof. The vinyl acrylic latex polymers are stabilized by the addition of appropriate nonionic or anionic/nonionic surfactant systems in accordance with well-known methods for preparing and stabilizing latex polymer systems. Vinyl acrylic latex polymers of the type described above are commercially available from, for example, Rohm and Haas Company, Philadelphia, Pa. or S.C. Johnson Wax, Racine, Wis. The aziridine prepolymer can comprise, for example, pentaerythritol-tris-[beta-(aziridinly) propionate]. The carbodiimide may comprise, for example, 1,3-dicyclohexylcarbodiimide. The partially hydrolyzed acrylic encapsulating material preferably is admixed with a particulate micron-sized material such as silica prior to or simultaneously with coating the delayed-release oxidizer component. The acrylic may be admixed with the particulate silicate in an amount such that the particulate comprises from about 0% to about 60% by weight of coating solids present. Other resins may also be suitable, including, but not limited to, polymeric materials that will degrade when downhole. The terms "degrade," "degradation," or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation. Suitable examples include polysaccharides such as dextran or cellulose; chitins; chitosans; proteins; aliphatic polyesters; poly(lactides); poly(glycolides); poly($\epsilon$-caprolactones); poly(hydroxybutyrates); poly(anhydrides); aliphatic polycarbonates; ortho esters, poly(orthoesters); poly(amino acids); poly(ethylene oxides); and polyphosphazenes. Of these suitable degradable polymers, aliphatic polyesters and polyanhydrides are preferred. One should note that if the encapsulating material releases an acid upon degradation downhole, this generated acid derivative should be considered in the overall filter cake degradation process. Selection of a suitable encapsulation resin-type coating material may be affected by at least the temperature of the subterranean formation to which the fluid will be introduced.

The amount of an encapsulating coating to include can depend on the desired rate of release of the delayed-release oxidizer component. One of ordinary skill in the art, with the benefit of this disclosure, will recognize the appropriate amount of encapsulating material to use based on the desired rate of release of the delayed-release oxidizer component. In certain embodiments, the encapsulated delayed-release oxidizer component will have an encapsulated coating in an amount from about 10% to about 50% by weight of the encapsulated delayed-release oxidizer component. Preferably, the coating will comprise from about 20% to about 40% by weight of the encapsulated delayed-release oxidizer component, depending on the rate of the desired release.

In certain instances, to achieve certain beneficial effects of the present invention, the encapsulated delayed-release oxidizer component particulates should have a specific gravity that will enable them to remain in a desired location within the well bore. For instance, in a gravel pack application, the encapsulated delayed-release oxidizer component particulates should have a specific gravity that will enable them to be dispersed within the gravel pack, preferably uniformly. For instance, the specific gravity of the encapsulated delayed-release oxidizer component particulates should be high enough that they do not return to the surface during the operation and they do not clump when downhole. For example, in certain embodiments, the magnesium peroxide or the calcium peroxide delayed-release oxidizer components may be encapsulated and may have a specific gravity of about the same specific gravity of the gravel particulates in the gravel pack composition, preferably at least about 2, and most preferably above 2.5.

In the practice of the present invention, depending upon the temperature of the formation to be treated and the desired break time of the filter cake, the encapsulated delayed-release oxidizer component may be present in an amount of from about 0.1 to in excess of 50 pounds per 1,000 gallons of a gravel pack fluid.

The delayed-release acid components of the filter cake degradation compositions of the present invention comprise an acid derivative. Examples of suitable acid derivatives include esters, such as ortho esters; poly(ortho esters); aliphatic polyesters; lactides, poly(lactides); glycolides; poly(glycolides); lactones; poly($\epsilon$-caprolactones); poly(hydroxybutyrates); anhydrides; poly(anhydrides); and poly(amino acids). The delayed-release acid component also may comprise an esterase enzyme if desired. Blends of certain acid-releasing degradable materials also may be suitable. One example of a suitable blend of materials includes a blend of a poly(lactic acid) and an ortho ester. It is within the ability of one skilled in the art, with the benefit of this disclosure, to select a suitable acid-releasing degradable material. When used in the present invention, a preferable result is achieved if the acid-releasing degradable material degrades slowly over time as opposed to instantaneously. Even more preferable results have been obtained when the degradable material does not substantially degrade until after the subterranean treatment, such as a gravel packing or fracturing operation, has been substantially completed. In one embodiment, the delayed-release acid component may be encapsulated as described above with respect to the delayed-release oxidizer component.

The delayed-release acid component should be included in filter cake degradation compositions of the present invention in an amount sufficient to react with the acid-consuming component of the delayed-release oxidizer component and then interact with the acid-soluble component of the filter cake so as to degrade at least a portion of it. In some embodiments, this will be from about 1% to about 40% of the composition and in certain preferred embodiments, from about 5% to about 20% of the composition.

When the compositions and methods of the present invention are used in conjunction with a gravel pack operation, any particulate material suitable for use in subterranean gravel pack applications is suitable for use as the particulates in the compositions and methods of the present invention. Natural sand, quartz sand, particulate garnet, glass, ground walnut hulls, nylon pellets, bauxite, ceramics, polymeric materials, or the like are all suitable. Suitable sizes range from 4 to 100 U.S. mesh; in certain preferred embodiments the sizes range from 10 to 70 U.S. mesh.

In some embodiments, the filter cake degradation compositions of the present invention are placed into an open hole well bore containing a drill-in fluid filter cake on the formation face in conjunction with a gravel pack treatment. The gravel pack fluid comprises a filter cake degradation composition of the present invention, gravel, and an aqueous-based fluid. Optionally, other additives typically used with a gravel pack treatment in such an application may be present. In most instances, it is desirable for the filter cake degradation composition to degrade the filter cake at some time after the gravel pack has been placed, e.g., more than 5 hours, rather than when the gravel pack is placed. This delay period will depend on particular circumstances and may range accordingly. This may be desirable, for example, when it is necessary to remove a gravel pack placement tool from the well bore. This degradation delay period, inter alia, may be controlled by selection of the delayed-release acid components and delayed-release oxidizer components and the concentration of those components in the filter cake degradation composition. One of ordinary skill in the art with the benefit of this disclosure will recognize the parameters necessary to achieve a desired degradation delay for a given application.

An exemplary embodiment of the present invention involves introducing into a subterranean formation a filter cake degradation composition comprising a delayed-release acid component comprising an ester or an ester plus an esterase enzyme formulated to provide the desired degradation of at least a portion of the acid-soluble portion of the filter cake, and a delayed-release oxidizer component that provides the acid-consuming component that will react with the acid derivative of the delayed-release acid component so as to delay the acid's interaction with the acid-soluble portion of the filter cake. The delayed-release oxidizer component may comprise encapsulated delayed-release oxidizer components. Materials such as urea or urea plus a urease enzyme also may be included. The release rate of the acid-consuming component, inter alia, determines the delay of the reaction between the acid derivative and the acid-soluble portion of the filter cake. The release rate of the delayed-release acid, inter alia, determines the total degradation time of the acid-soluble portion of the filter cake.

In one embodiment, the present invention provides a method of degrading a filter cake comprising an acid-soluble portion and a polymeric portion in a subterranean formation comprising the steps of: introducing a filter cake degradation composition comprising a delayed-release acid component and a delayed-release oxidizer component to a well bore penetrating the subterranean formation; allowing the delayed-release acid component to release an acid derivative and the delayed-release oxidizer component to release an acid-consuming component; allowing the acid-consuming component to interact with the acid derivative to delay a reaction between at least a portion of the acid derivative and at least a portion of the acid-soluble portion of the filter cake and to produce hydrogen peroxide; allowing the acid derivative to degrade at least a portion of the acid-soluble portion of the filter cake after a chosen delay period; and allowing the hydrogen peroxide to degrade at least a portion of the polymeric portion of the filter cake.

In one embodiment, the present invention provides a filter cake degradation composition comprising a delayed-release oxidizer component that will release an acid-consuming component and a delayed-release acid component that will release an acid.

Thus, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of degrading a filter cake comprising an acid-soluble portion and a polymeric portion in a subterranean formation comprising the steps of:
    introducing a filter cake degradation composition comprising
        a delayed-release acid component that comprises a degradable material selected from the group consisting of orthoesters, poly(orthoesters), and combinations thereof, and
        a delayed-release oxidizer component to a well bore penetrating the subterranean formation;
    allowing the delayed-release acid component to release an acid derivative and the delayed-release oxidizer component to release an acid-consuming component;
    allowing the acid-consuming component to interact with the acid derivative to delay a reaction between at least a portion of the acid derivative and at least a portion of the acid-soluble portion of the filter cake and to produce hydrogen peroxide;
    allowing the acid derivative to degrade at least a portion of the acid-soluble portion of the filter cake after a delay period; and
    allowing the hydrogen peroxide to degrade at least a portion of the polymeric portion of the filter cake.

2. The method of claim 1 wherein the acid-soluble portion of the filter cake is selected from the group consisting of calcium carbonate, chemically bonded ceramic bridging agents, magnesium compounds, and combinations thereof.

3. The method of claim 1 wherein the polymeric portion of the filter cake comprises a polysaccharide or a derivative thereof.

4. The method of claim 1 wherein the acid-consuming component comprises a peroxide.

5. The method of claim 1 wherein the acid-consuming component is selected from the group consisting of $ZnO_2$, $CaO_2$, $MgO_2$, and combinations thereof.

6. The method of claim 1 wherein the delayed-release oxidizer component is selected from the group consisting of calcium oxide, zinc oxide, magnesium oxide, zinc hydroxide, calcium hydroxide, magnesium hydroxide, urea, urease enzymes, and combinations thereof.

7. The method of claim 1 wherein the delayed-release oxidizer component comprises about 0.1% to about 4% of the filter cake degradation composition.

8. The method of claim 1 wherein the delayed-release oxidizer component comprises about 0.2% to about 1% of the filter cake degradation composition.

9. The method of claim 1 wherein at least a portion of the delayed-release oxidizer component is encapsulated by an encapsulating coating.

10. The method of claim 1 wherein the delayed-release oxidizer component is selected from the group consisting of encapsulated $ZnO_2$ particulates, encapsulated $CaO_2$ particulates, encapsulated $MgO_2$ particulates, and combinations thereof.

11. The method of claim 9 wherein the encapsulating coating is selected from the group consisting of partially hydrolyzed acrylic resins, degradable polymeric materials, and combinations thereof.

12. The method of claim 9 wherein the encapsulating coating is present in an amount from about 10% to about 50% by weight of the encapsulated delayed-release oxidizer component.

13. The method of claim 9 wherein the encapsulating coating is present in an amount from about 20% to about 40% by weight of the encapsulated delayed-release oxidizer component.

14. The method of claim 9 wherein the encapsulated particulates have a specific gravity of at least about 2.

15. The method of claim 1 wherein the filter cake degradation composition is present in a gravel pack fluid.

16. The method of claim 15 wherein the delayed-release oxidizer component is present in an amount of from about 0.1 pounds to about 50 pounds per 1,000 gallons of the gravel pack fluid.

17. The method of claim 15 wherein the gravel pack fluid comprises an aqueous-based fluid and a particulate material.

18. The method of claim 15 wherein the particulate material is selected from the group consisting of natural sand, quartz sand, particulate garnet, glass, ground walnut hulls, nylon pellets, bauxite, ceramics, polymeric materials, and combinations thereof.

19. The method of claim 1 wherein the delayed-release acid component further comprises a component selected from the group consisting of aliphatic polyesters, lactides, poly(lactides), glycolides, poly(glycolides), lactones, poly($\epsilon$-caprolactones), poly(hydroxybutyrates), anhydrides, poly(anhydrides), poly(amino acids), and combinations thereof.

20. The method of claim 1 wherein the delayed-release acid component further comprises an esterase enzyme.

21. The method of claim 1 wherein the delayed-release acid component further comprises a poly(lactic acid).

22. The method of claim 1 wherein the filter cake is formed from a drill-in fluid.

23. The method of claim 1 wherein the delayed-release acid component is included in the filter cake degradation composition in an amount sufficient to react with the acid-consuming component of the delayed-release oxidizer component and then interact with the acid-soluble portion of the filter cake so as to degrade at least a portion of the acid-soluble portion of the filter cake.

24. The method of claim 1 wherein the delayed-release acid component is present in the filter cake degradation composition in an amount from about 1% to about 40% of the composition.

25. The method of claim 1 wherein the delayed-release acid component is present in the filter cake degradation composition in an amount from about 5% to about 20% of the composition.

* * * * *